United States Patent [19]
Kurimoto et al.

[11] 3,791,022
[45] Feb. 12, 1974

[54] MACHINE TOOL WITH AUTOMATIC TOOL CHANGING APPARATUS

[75] Inventors: Mikishi Kurimoto, Nagoya; Syoji Inagaki, Kariya; Noriyasu Oda, Gamagori, all of Japan

[73] Assignee: Toyoda Koki Kabushiki Kaisha, Kariya-shi, Aichi-ken, Japan

[22] Filed: Feb. 2, 1972

[21] Appl. No.: 222,915

[52] U.S. Cl. .............................................. 29/568
[51] Int. Cl. ........................................... B23q 3/157
[58] Field of Search .......................... 29/568, 26 A

[56] References Cited
UNITED STATES PATENTS

| | | | |
|---|---|---|---|
| 3,590,470 | 7/1971 | Brainard | 29/568 |
| 3,431,635 | 3/1969 | Balding | 29/568 |
| 3,422,724 | 1/1969 | Zankl et al. | 29/568 X |
| 3,704,510 | 12/1972 | Sedgwick et al. | 29/568 |

Primary Examiner—Andrew R. Juhasz
Assistant Examiner—F. R. Bilinsky
Attorney, Agent, or Firm—Oblon, Fisher, Spivak, McClelland & Maier

[57] ABSTRACT

In a machine tool with an automatic tool changing apparatus, a spindle is provided which includes a projection at one end thereof and a drawing device therein for clamping the tool thereon. A tool magazine is provided for storing diverse tools, each of the diverse tools having a projection at the periphery thereof, and a tool transfer means is provided for transferring tools between the spindle and the tool magazine. Control means are provided for rotating the spindle through at least one revolution when a succeeding tool is inserted into the spindle by the tool transfer means, so as to abut the projection of the spindle on the projection of the tool, and for causing the drawing device to clamp the succeeding tool on the spindle after completing the rotation of the spindle through its one round.

9 Claims, 11 Drawing Figures

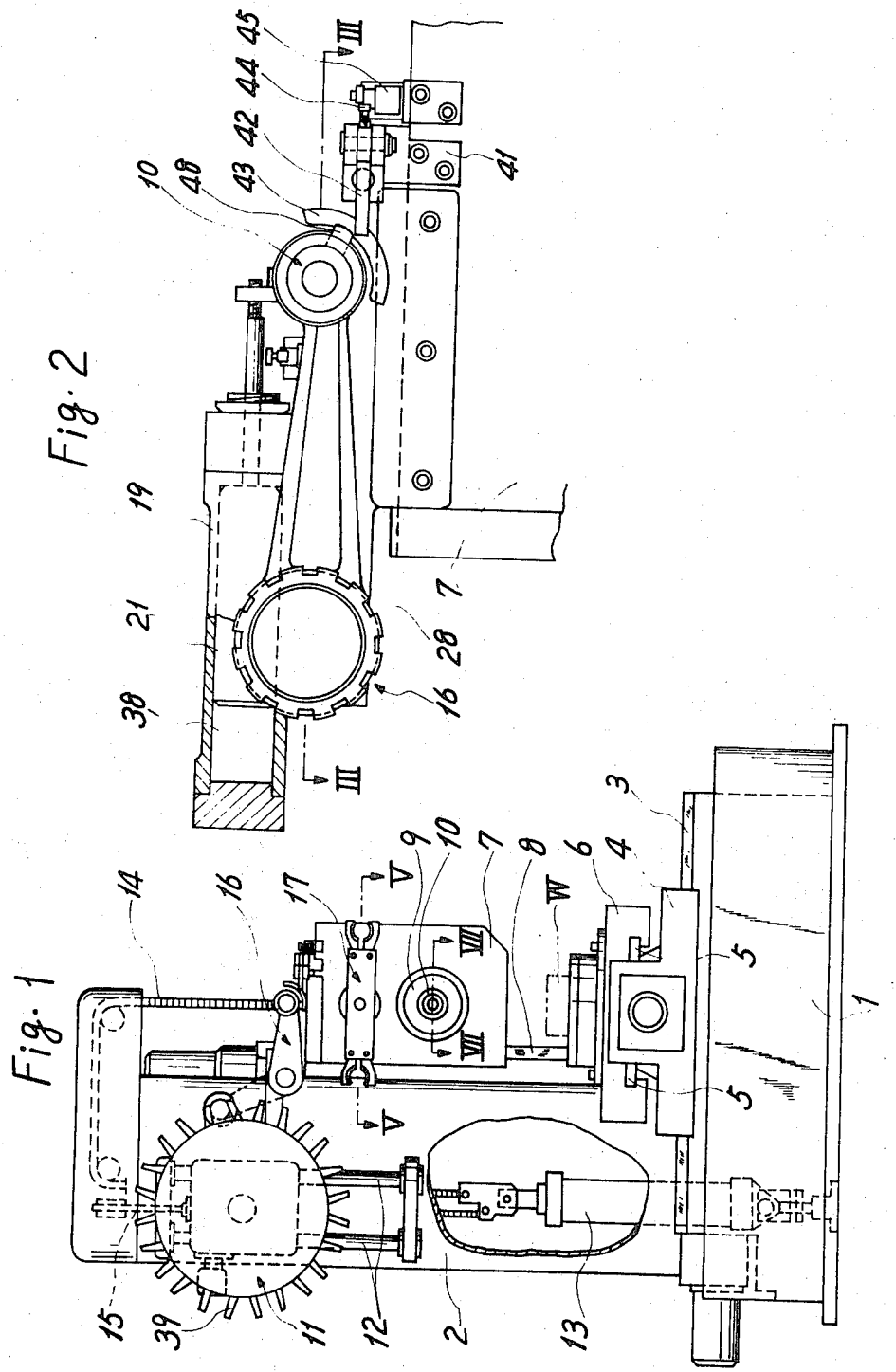

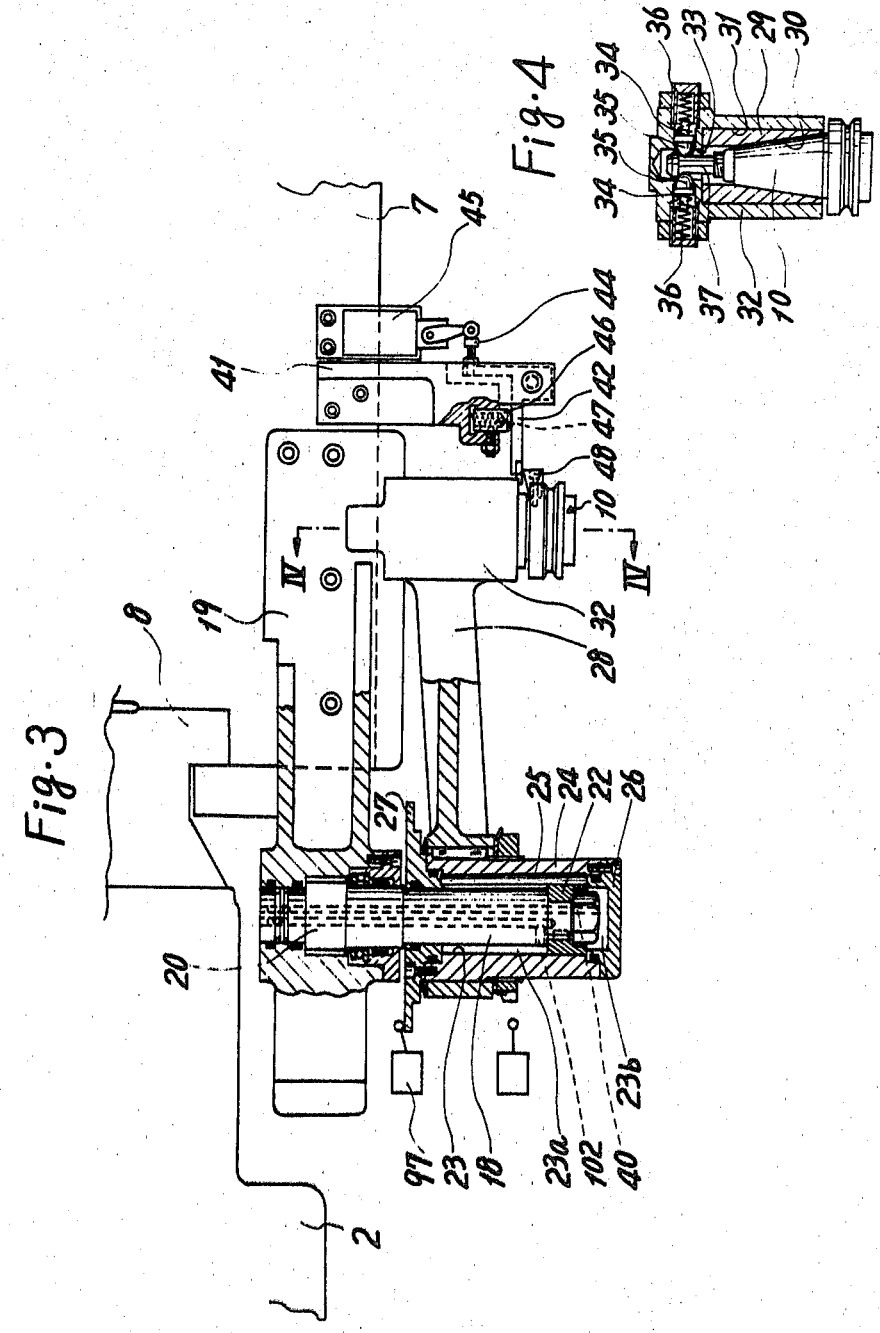

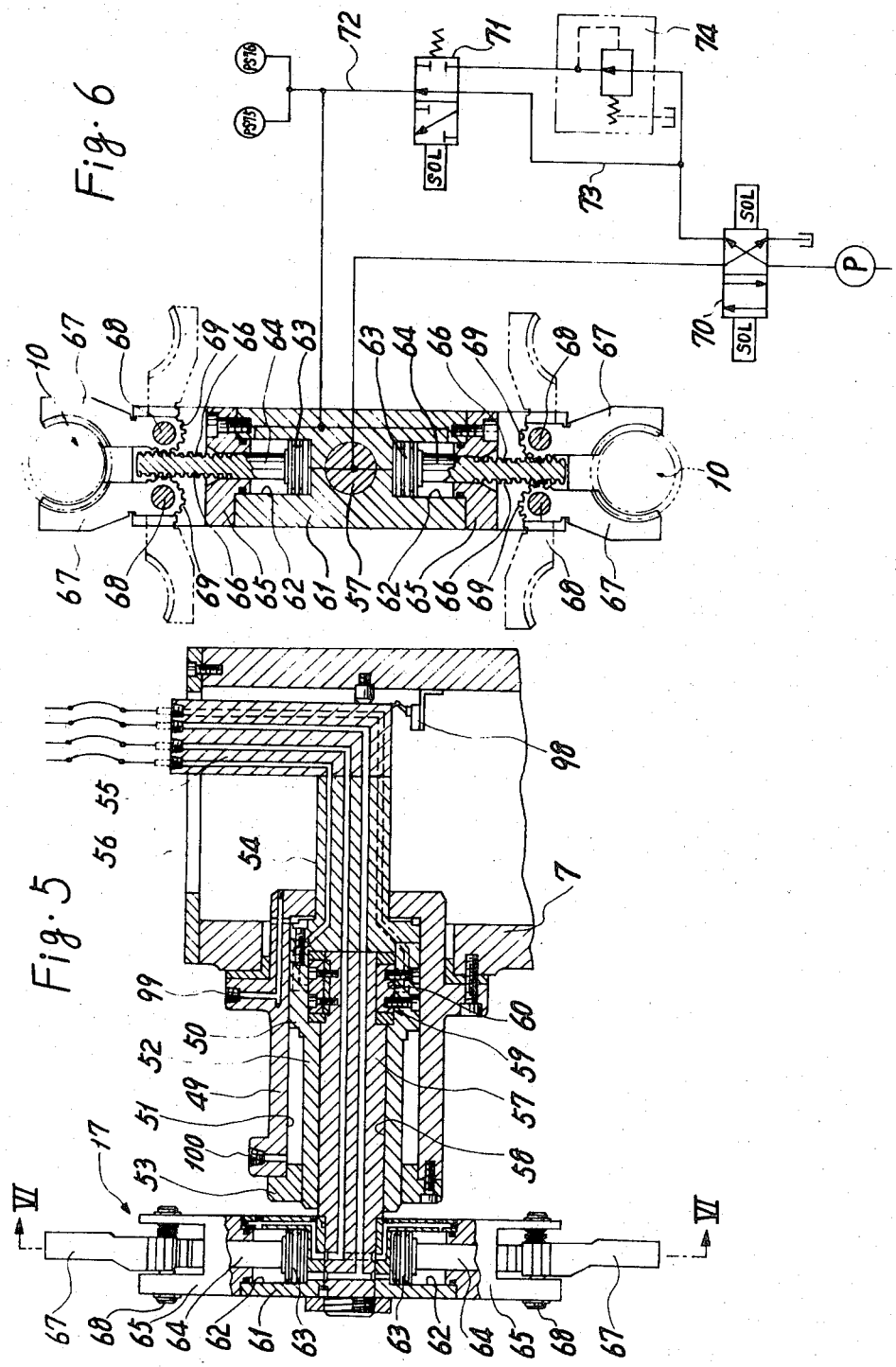

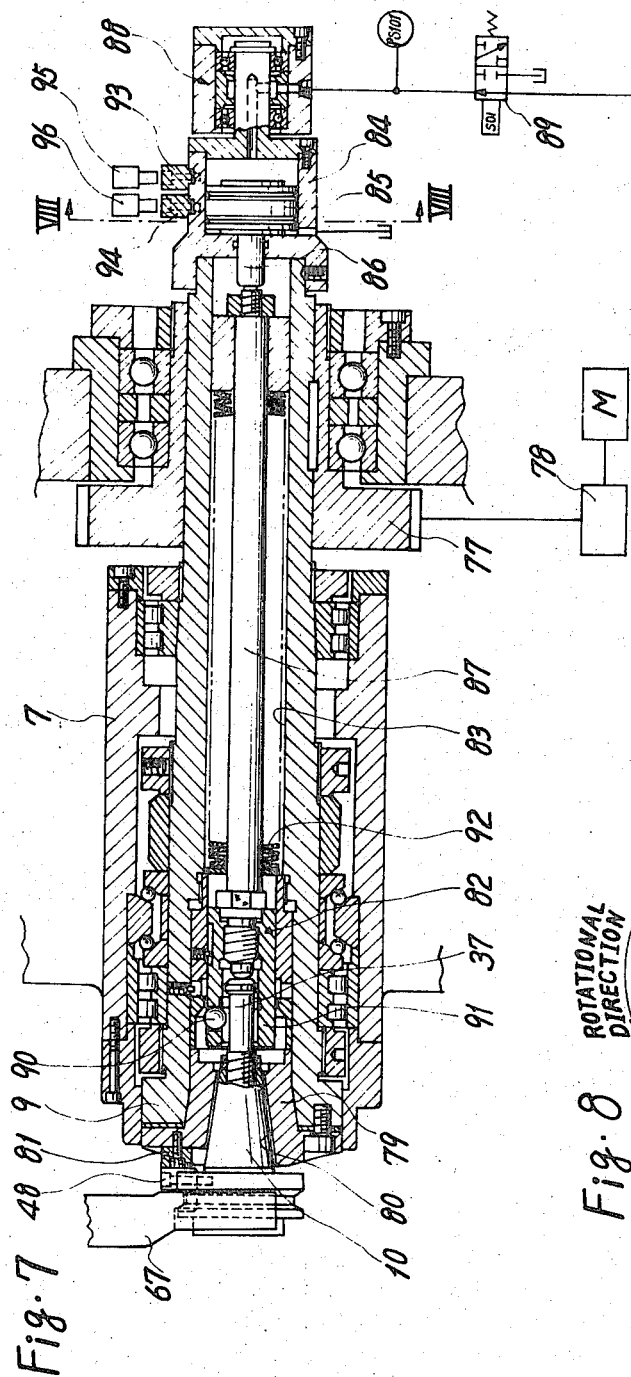
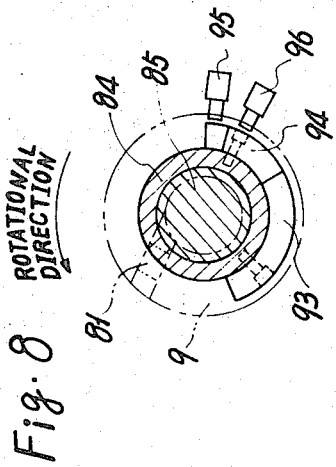
Fig. 7
Fig. 8

MACHINE TOOL WITH AUTOMATIC TOOL CHANGING APPARATUS

BACKGROUND OF THE INVENTION

1. Field of the Invention

The present invention relates generally to machine tools and more particularly to a machine tool having an improved automatic tool changing apparatus.

2. The Prior Art

In prior art machine tools having automatic tool changing apparatus, a key-way of a tool holder is engaged by a key which is secured to a rotary spindle of the machine tool for transmitting the torque of the spindle to the tool holder.

In such a machine, it is therefore necessary to stop the spindle at a precise angular position so that the key secured thereto may be aligned and engaged with the key-way of the tool holder which is transferred by a transfer means. It is also necessary to orient the key-way of the tool holder when storing the tool holders in a tool magazine. To stop the spindle at a precise angular position, a device is required which is operative to mechanically index the spindle, and furthermore the orientation of the key-way of the tool holder in the tool magazine involves much troublesome labor. Moreover, if the tool holder rotates, even a small amount, in the transfer means, while being transferred, the key-way of the tool holder is no longer able to engage the key of the spindle.

SUMMARY OF THE INVENTION

Accordingly, it is an object of the present invention to provide a machine tool having a new and improved automatic tool changing apparatus.

Another object of the present invention is the provision of a machine tool having a new and improved automatic tool changing apparatus which is capable of positively and correctly exchanging the tool on a spindle for a succeeding tool without precisely indexing the spindle.

Another object of the present invention is the provision of a machine tool having a new and improved automatic tool changing apparatus wherein a key which is engagable with the key of a spindle is secured to the tool.

A further object of the present invention is the provision of a machine tool having a new and improved automatic tool changing apparatus wherein the position of the key of a tool is inspected by an inspecting means, whereby orientation of the key of the tool in the tool magazine is no longer necessary.

Yet one other object of the present invention is the provision of a machine tool having a new and improved tool changing apparatus wherein the stop position of the spindle is controlled such that the tool may be mounted on the spindle without interference between the key of the spindle and the key of the tool.

The foregoing and other objects are attained in accordance with one aspect of the present invention through the provision of cooperating projections on a spindle and on each of a plurality of diverse tools and a tool transfer device for transferring tools between the spindle and a tool magazine. When a new tool is inserted into the spindle by the tool transfer device, means are provided for detecting the orientation of the spindle projection and the spindle is controlled so as to be automatically rotated through a predetermined angular turn so as to abut the spindle projection on the tool projection, while avoiding interference therebetween. A drawing device is additionally provided for clamping the tool in the spindle after the spindle has been rotated to bring the projection thereof into abutting relation with the tool projection.

DESCRIPTION OF THE DRAWINGS

Various other objects, features and attendant advantages of the present invention will be more fully appreciated as the same becomes better understood from the following detailed description of a preferred embodiment of the present invention when considered in connection with the accompanying drawings in which:

FIG. 1 is a front elevational view of a machine tool embodying the subject matter of the present invention;

FIG. 2 is an enlarged detail view in front elevation illustrating an intermediate tool transfer device and an inspecting means of the machine tool depicted in FIG. 1;

FIG. 3 is a partly sectional view taken along the line III—III of FIG. 2;

FIG. 4 is a sectional view taken along the line IV—IV of FIG. 3;

FIG. 5 is an enlarged sectional view taken along the line V—V of FIG. 1, illustrating a tool transfer device;

FIG. 6 is a sectional view taken along the line VI—VI of FIG. 5 showing a hydraulic circuit for actuating fingers of the tool transfer device;

FIG. 7 is an enlarged sectional view taken along the line VII—VII of FIG. 1, illustrating a spindle and a drawing device;

FIG. 8 is a sectional view taken along the line VIII—VIII of FIG. 7;

DETAILED DESCRIPTION OF A PREFERRED EMBODIMENT

Figure 10:
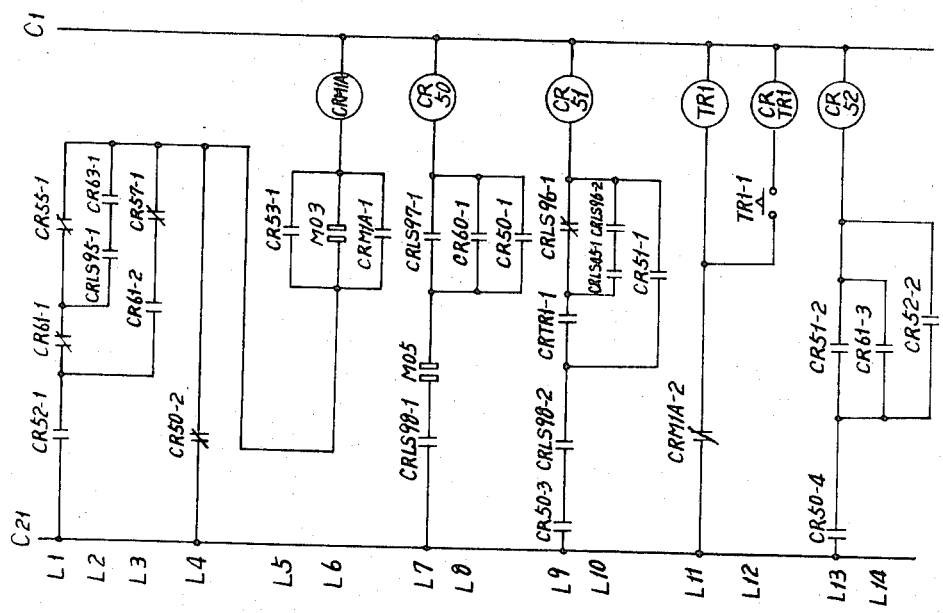

Referring now to the Drawings, wherein like reference numerals designate identical or corresponding parts through the several views, and more particularly to FIG. 1 thereof, a machine tool with an automatic tool changing apparatus is shown having a bed 1 on which a column 2 is upstandingly mounted. The bed 1 has guide ways 3 longitudinally disposed thereon which support a saddle 4 for movement toward and away from the column 2. The saddle 4 is likewise formed with guide ways 5 which run transversely to the guide ways 3, and carry a table 6 which is adapted to support a workpiece W thereon.

A spindle head 7 is slidably disposed on the column 2 on guide ways 8 and a power elevating screw, not shown, is provided for positioning the spindle head 7 vertically on the guide ways 8. A spindle 9 is rotatably supported in the spindle head 7 being adapted to carry a tool or a tool holder 10.

A tool magazine 11 for storing a supply of tool holders is slidably mounted on vertical ways 12 secured to the column 2. The spindle head 7 and the tool magazine 11 are connected to a hydraulic actuator 13 by respective drive chains 14 and 15 such that the tool magazine 11 is moved synchronously with the spindle head 7, whereby both are always maintained in the same relative position.

An intermediate transfer device 16 and a tool transfer device 17 which are operative to transfer the tool holder from the tool magazine 11 to the spindle 9, and vice versa, are arranged on the spindle head 7.

As shown in FIGS. 2 and 3, the intermediate transfer device 16 is mounted on the top of the spindle head 7. A rotary shaft 18 which is disposed in parallel relation with the spindle 9 is rotatably journalled in a support 19 which is secured to the spindle head 7. A pinion 20 which is integrally mounted on the shaft 18 engages a rack formed at a middle portion of a piston 21 which is slidably mounted transversely of the shaft 18 in a cylinder 38 provided in the support 19.

Firmly secured to the shaft 18 at the front end thereof is a piston 22 which is slidably received in a cylinder 23 provided in a rotary body 24. A bar 25 is disposed in the cylinder 23 in parallel relation with the shaft 18. A groove formed on the piston 22 engages the bar 25 so as to prevent relative rotation between the shaft 18 and the rotary body 24. Caps 26 and 27 are secured against the ends of the rotary body 24 for closing the cylinder 23.

An arm 28 is rigidly fixed to the rotary body 24. As shown in FIG. 4, a sleeve 29 having a tapered bore 30 therein is fixed in a bore 31 provided in a holding portion 32 of the arm 28 in parallel relation with the shaft 18. A blind bore 33 is provided in the holding portion 32 being coaxial with the bottom of the bore 31. Opposing bores 34 are provided in the holding portion 32 being perpendicular with the blind bore 33. Respective plungers 35 are slidably mounted in the bores 34 and are urged toward the center of the blind bore 33 by respective springs 36 so that the same may engage and hold a drawing bolt 37 of the tool holder 10 which is inserted into the tapered bore 30 of the sleeve 29.

The operation of the intermediate transfer device 16 will be described below. If pressurized fluid is supplied to the right chamber of the cylinder 38, as seen in FIG. 2, the piston 21 will be moved in a leftward direction and the shaft 18 will be rotated in a counterclockwise direction by means of the rack and pinion. The arm 28 will therefore be rotated in the same direction toward a first tool exchange position, shown in FIG. 1 by a phantom line, whereby a previously used tool holder 10 which is held in the holding portion 32 of the arm 28 will be disposed between a pair of claws 39 of the tool magazine 11. The claws 39 will then grip the tool holder 10. Pressurized fluid will thereafter be supplied to a rear chamber 23a of the cylinder 23 through a conduit 102 which is provided in the shaft 18. The rotary body 24 and the arm 28 will be retracted in accordance therewith so as to release the tool holder 10 from the tapered bore 30 provided in the holding portion 32. The magazine 11 will be rotated in order to align a tool holder 10 which will be used in the next machining operation with the holding portion 32 of arm 28. Pressurized fluid will thereafter be supplied to a front chamber 23b of the cylinder 23 through a conduit 40 which is provided in the shaft 18. The rotary body 24 and the arm 28 will be advanced in accordance therewith so as to insert and hold the next tool holder 10 in the tapered bore 30. The claws 39 of the tool magazine 11 will then release the next tool holder 10. Pressurized fluid will be supplied to the left chamber of the cylinder 38, and the shaft 18 will then be rotated in a clockwise direction by means of the rack and pinion. The arm 28 will therefore be rotated in the same direction toward a second tool exchange position, shown in FIG. 1 by a solid line. Thereafter pressurized fluid will be supplied to the rear chamber 23a of the cylinder 23 through the conduit 102 for retracting the rotary body 24 and the arm 28 so as to position the holding portion 32 holding the next tool holder 10 therein at a starting position, as shown in FIG. 3.

Fixedly mounted on the spindle head 7 is a bracket 41 on which an L-shaped lever 42 is pivotally mounted at the middle portion thereof. An arc-shaped member 43 is secured to one end of the L-shaped lever 42 such that the same is aligned with the periphery of the tool holder 10 at the starting position. A dog 44 which is fixed to the other end of the L-shaped lever 42 is opposed by a limit switch 45 which also is secured to the spindle head 7. A pin 46 is slidably mounted in the bracket 41 and is urged toward the L-shaped lever 42 by a spring 47, so that the L-shaped lever 42 is rotated in accordance therewith in a counterclockwise direction until it abuts a part of the bracket 41.

Figure 9:
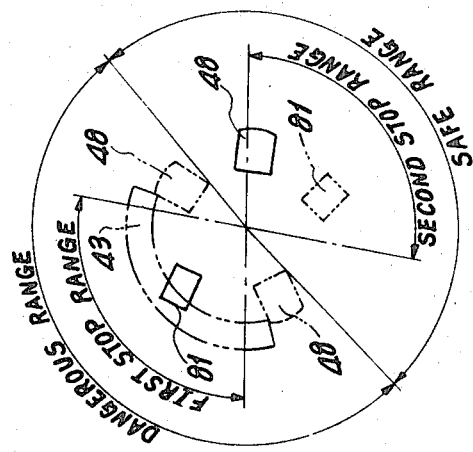
FIG. 9 is a diagram showing the relationship between the key of the spindle and the key of the tool holder; and, FIGS. 10 and 11 are diagrams of an electrical circuit for controlling the tool changing operation.

If a key 48 which is secured to the tool holder 10 abuts on the arc-shaped member 43, the L-shaped lever 42 will be rotated in a clockwise direction to actuate the limit switch 45 upon retraction of the tool holder. If the key 48 does not abut on the arc-shaped member 43, when the tool holder is retracted, the L-shaped lever 42 will not actuate the limit switch 45. If the limit switch 45 is actuated, the key 43 will be in a dangerous range which is shown in FIG. 9 and will be explained hereinafter. If the limit switch 45 is not actuated, the key 48 will be in a safe range, also shown in FIG. 9. It should be also appreciated that since the tool holder 10 is rotated by an angle of 180° when it is transferred by the tool transfer device 17 from the starting position to the spindle 9, the dangerous range at the end surface of the spindle 9, shown in FIG. 9, is opposed to the position of the arc-shaped member 43 at the starting position.

As shown in FIG. 5, the transfer device 17 is secured to the front surface of the spindle head 7. A housing 49 is fixedly mounted on the spindle head 7. A piston 50 is slidably received in a cylinder 51 which is provided in the housing 49 in parallel relation with the spindle 9. Integrally connected to the piston 50 and extending through a cap 53 secured against the end of the housing 49 is a piston rod 52. A piston rod 54 secured to the piston 50 extends through the bottom or rear of the housing 49. A tail 55 is secured to the rear end of the piston rod 54 at a right angle thereto being slidably engaged with a slot 56 provided on the spindle head 7 so as to prevent the piston 50 from rotating.

A shaft 57 is rotatably journalled in an axial bore 58 in the piston rod 52, and is connected to a rotary actuator 59 which is arranged in a cylinder 60 also provided in the piston 50. The rotary actuator 59 may be a structure such as described in the U.S. application of *Tamaki Tomita* et al., Ser. No. 861,666, filed Sept. 29, 1969. For an understanding of the present invention it is sufficient to appreciate that the rotary actuator 59 is operative to rotate the shaft 57 through an angle of both 90° and 180°. A change arm 61 is fixedly securd to the front end of the shaft 57 at the middle portion thereof. Opposing cylinders 62 are respectively provided in each of the ends of the change arm 61 in perpendicular relation with the shaft 57. As shown in FIG. 6, respective pistons 63 are slidably engaged in the cylinders 62. Piston rods 64 are integrally connected to the pistons 63 and extend outwardly through respective bifurcated caps 65 which are secured against the ends of the change arm 61. Each piston rod 64 is provided with racks 66 on opposite sides thereof. A pair of fingers 67 are pivotally mounted on each bifurcated cap 65 by pins 68 which are secured thereto in parallel relation with the shaft 57. A sector gear 69 provided on each finger 67 in coaxial relation with the pin 68 engages one of the racks 66 provided on the piston rod 64.

The inner chambers of the cylinders 62 are connected to a solenoid operated valve 70 which is connected to a pressure source P and to an oil reservoir. The outer chambers of the cylinders 62 are connected to a solenoid operated valve 71 through a conduit 72. The solenoid operated valve 71 is, in turn, connected to the solenoid operated valve 70 through a conduit 73. A reducing valve 74 is connected between solenoid operated valves 70 and 71 in parallel with the conduit 73. Pressure switches PS75, PS76 for detecting high and low pressures are connected to the conduit 72.

As shown in FIG. 7, the spindle 9 is rotatably journalled in the spindle head 7. A gear 77 is keyed to the spindle 9 and is connected to a motor M through a conventional speed change gear 78 so as to rotate the spindle 9. It should be understood that the speed change gear 78 is operative to vary the rotational frequency of the spindle 9.

An adapter 79 having a tapered bore 80 therein is fixed to the front end of the spindle 9. A key 81 is secured to the adapter 79 such that it is engageable with the key 48 of the tool holder 10 when the tool holder 10 is inserted into the tapered bore 80.

A drawing device 82 is arranged in a bore 83 which is coaxially provided in the spindle 9. A cylinder 84 is coaxially secured to the rear end of the spindle 9 and slidably receives a piston 85 therein. A piston rod 86 of the piston 85 extends through the bottom of the cylinder 84 and opposes a rod 87 of the drawing device 82.

A conventional distributor 88 which is operative to supply pressurized fluid to the right chamber of the cylinder 84 is mounted on the spindle head 7.

The drawing device 82 and the distributor 88 may be such structures as described in the aforementioned copending application, Ser. No. 861,666. For an understanding of the present invention, it is sufficient to appreciate that if a solenoid operated valve 89 is shifted to the state shown in FIG. 7, pressurized fluid is supplied to the right chamber of the cylinder 84 through the distributor 88. The piston 86 is moved in accordance therewith in a leftward direction and urges the rod 87 of the drawing device 82 such that balls 90, which are movably received in a sleeve 91 connected to the rod 87, release the drawing bolt 37 of the tool holder 10. If the solenoid operated valve 89 is shifted to a state opposite to that shown in FIG. 7, the right chamber of the cylinder 84 is connected to the oil reservoir through the distributor 88, and accordingly the rod 87 is urged by a spring 92 in a rightward direction such that the balls 90 engage and draw the drawing bolt 37 of the tool holder 10, whereby the tool holder 10 is firmly mounted on the spindle 9.

A first dog 94 is circumferentially disposed on the cylinder 84. A second dog 93 which is, as shown in FIG. 8, longer than the first dog 94 is also disposed on the cylinder 84 in parallel relation with the first dog 94. Conventional contactless microswitches 96 and 95 are mounted on the spindle head 7 and are respectively opposed to the first and second dogs 94, 93.

It should be understood that a conventional numerical control device, not shown, is utilized as a main part of a controller of the machine tool. The details of the numerical control device will not be given since the same are conventional and may be, for example, the numerical control system manufactured by Fujitsu, Ltd., Kawasaki, Japan and sold as FANUC MODEL 260.

The machine tool having an automatic tool changing apparatus which is constructed as described above will operate in the following manner.

It should be understood that a relay CRM1A at line L6 in FIG. 10 is in an energized condition while a miscellaneous function contact MO3 which is provided in the numerical control device is in a closed position. Since a contact of the relay CRM1A which is arranged between an electric source and the motor M is in a closed position in accordance therewith, the motor M is rotated in a normal direction. The rotation of the motor M is transmitted to the spindle 9 through the speed change gear 78.

The intermediate tool transfer device 16 is then in the starting position and the tool transfer device 17 is in a retracted position, and accordingly, a limit switch 97 shown in FIG. 3 and a limit switch 98 shown in FIG. 5 are in their actuated positions.

Now, assuming that the miscellaneous function contact MO5 at line L7 which is provided in the numerical control device is closed in accordance with information which commands a tool change operation. The miscellaneous function contact MO3 will be opened in accordance with a closing of the contact MO5. Moreover, since a contact CRLS 98-1 of the limit switch 98 and a contact CLRS97-1 of the limit switch 97 are in a closed position, a relay CR50 at line L7 will be energized by a closing of the contact MO5 and will be self-held through a contact CR50-1. Since a normally closed contact CR50-2 at line L4 will be opened in accordance with the energization of the relay CR50, the relay CRMIA will be de-energized, accordingly the motor M will be de-energized. Subsequently the motor will be braked and stopped. A timer TR1 at line L11 will be energized through a normally closed contact CRM1A-2 of the relay CRM1A. A contact TR1-1 of the timer TR1 at line L12 will be closed a predetermined period of time after the timer TR1 is energized, accordingly a relay CRTR1 at line L12 will be energized. It should be understood that the timer TR1 is utilized in order to set the period of time during which the spindle 9 will be completely stopped.

If the contactless microswitch 96 is actuated by the first dog 94 when the spindle 9 is stopped, it will be indicated that the key 81 of the spindle 9 is in a first stop range shown in FIG. 9.

However, if the contactless microswitch 96 is not actuated when the spindle 9 is stopped, a normally closed contact CRLS96-1 of the contactless switch 96 at line L9 will be kept in a closed position, accordingly a relay CR51 at line L9 will be energized through contacts CR50-3, CRLS98-2, CRTR1-1 and CRLS96-1 and will be self-held through a contact CR51-1. Since a contact CR51-2 of the relay CR51 at line L13 will be closed and a contact CR50-4 will be in a closed position, a relay CR52 at Line L13 will be energized and self-held through a contact CR52-2. The speed change gear 78 will be shifted in accordance therewith such that the spindle 9 will be rotated at the lowest rotational frequency.

Figure 11:
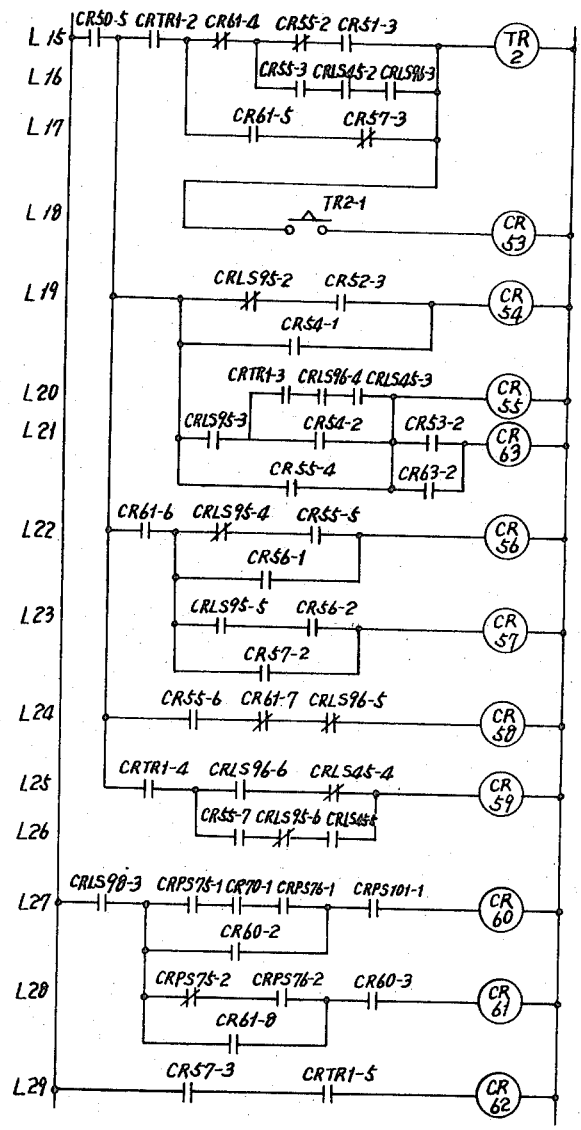

Concurrently, a timer TR2 at line L15 in FIG. 11 will be energized through contacts CR50-5, CRTR1-2, CR51-3 and normally closed contacts CR61-4, CR55-2. A contact TR2-1 of the timer TR2 at line L18 will be closed a predetermined period of time after the timer TR2 is energized, accordingly a relay CR53 at line L18 will be energized. It should be understood that the timer TR2 is utilized in order to set the period of time during which the speed change gear 78 is completely shifted. Since a contact CR53-1 of the relay CR53 at line L5 in FIG. 10 will be closed and contacts CR52-1, CR61-1 and CR55-1 at line L1 will be in a closed position, the relay CRM1A will be energized and self-held through a contact CRM1A-1, whereby the motor M will be energized. In accordance therewith, the spindle 9 will be rotated at the lowest rotational frequency. The relay CRTR1 at line L12 will be de-energized by an opening of the normally closed contact CRM1A-2 of the relay CRM1A. Since the contact CRTR1-2 at line L15 will be opened in accordance therewith, the timer TR2 and the relay CR53 will be de-energized.

The second dog 93 will get clear of the contactless microswitch 95 in accordance with the rotation of the spindle 9. A relay CR54 at line L19 will therefore be energized through a normally closed contact CRLS 95-2 of the contactless microswitch 95 and a contact CR52-3 and will be self-held through a contact CR54-1. The contactless microswitch 95 will be actuated again by the second dog 93 in accordance with the further rotation of the spindle 9. Since a contact CRLS95-3 at line L21 will be closed in accordance therewith and a contact CR54-2 will be in a closed position, a relay CR55 at line L20 will be energized and self-held through a contact CR55-4. The normally closed contact CR55-1 at line L1 will therefore be opened, accordingly the relay CRM1A will be de-energized and the motor M will be stopped. In such condition the contactless microswitch 96 will be actuated by the first dog 94, and the key 81 of the spindle 9 will be in the first stop range.

If the contactless microswitch 96 is not actuated after the above-described adjusting rotation of the spindle 9, a relay CR58 at line L24 will be energized through normally closed contacts CRLS96-5, CR61-7 and a contact CR55-6 so as to indicate abnormality in the spindle stop operation.

Thus, the spindle 9 will be stopped in such a manner that the key 81 thereof will be in the first stop range. Therefore, if the key 48 of the tool holder 10 at the starting position is in the safe range, the keys 48 and 81, as shown in FIG. 9, will not interfere with each other. Accordingly, the tool transfer device 17 will exchange tool holders between the spindle 9 and the intermediate tool transfer device 16 as hereinafter described.

However, if the key 48 of the tool holder 10 at the starting position is in the dangerous range and thereby the limit switch 45 is actuated, there is some possibility of the keys 48 and 81 interfering with each other. Therefore, it is necessary to rotate the spindle 9 in such manner that the key 81 may be in a second stop range shown in FIG. 9. Since contacts CRLS45-1 and CRLS96-2 at line L10 will be in a closed position, the relay CR51 will be energized. The relay CR52 at line L13 will be energized in accordance therewith so as to shift the speed change gear 78 as described above. The relay CR55 at line L20 will be energized through contacts CRTR1-3, CRLS96-4 and CRLS45-3 at line L20, accordingly the normally closed contact CR55-1 at line L1 will be opened. The timer TR2 at line L15 will be energized through contacts CR55-3, CRLS45-2 and CRLS96-3 at line L16. The relay CR53 at line L18 will be energized in accordance therewith after the predetermined period of time. A relay CR63 at line L21 will be energized through a contact CR53-2 of the relay CR53 and will be self-held through a contact CR63-2, whereby a contact CR63-1 at line L2 will be closed. Since contacts CRLS95-1 and CR63-1 at line L2 will be in a closed position, the relay CRM1A will be energized by the closing of the contact CR53-1 at line L5, whereby the spindle 9 will be rotated at the lowest rotational frequency. The second dog 93 will get clear of the contactless microswitch 95 in accordance with the rotation of the spindle 9. Since the contact CRLS 95-1 at line L2 will be opened in accordance therewith, the relay CRM1A will be de-energized and the motor M will be stopped. Accordingly, the spindle 9 will be stopped in such manner that the key 81 thereof will be in a second stop range shown in FIG. 9. Therefore, the key 81 will not interfere with the key 48 of the tool holder 10 in the dangerous range.

In case the key 81 of the spindle 9 is in the first stop range and the key 48 of the tool holder 10 at the starting position is in the safe range, a contact CRLS96-6 and a normally closed contact CRLS 45-4 at line L25 will be in a closed position, accordingly a relay CR59 at line L25 will be energized. In case the key 81 of the spindle 9 is in the second stop range and the key 48 of the tool holder 10 is in the dangerous range, a normally closed contact CRLS95-6 and contacts CRLS45-5, CR55-7 at line 26 will be in a closed position, accordingly the relay CR59 will be energized. It should be understood that in the above cases the keys 48 and 81 will not interfere with each other.

Pressurized fluid will be supplied to the front chamber of the cylinder 23 in accordance with the energization of the relay CR59 so as to advance the arm 28 of the intermediate tool transfer device 16. Thereafter, the change arm 61 of the tool transfer device 17 will be rotated by the rotary actuator 59 by an angle of 90° in a counterclockwise direction. Then, the solenoid operated valve 70 and 71 will be shifted to a state shown in FIG. 6. High pressurized fluid will therefore be supplied to the outer chambers of the cylinders 62, whereby the pistons 63 will be moved in an inward direction and the fingers 67 will be rotated by means of the rack and pinion 66, 69 in such a manner that they will grip the tool holders 10 respectively being held in the spindle 9 and in the intermediate tool transfer device 16. Thereafter, the drawing device 82 in the spindle 9 will release the tool holder 10. Pressurized fluid will then be supplied to the right chamber of the cylinder 51 through a conduit 99, and the piston 50 and the change arm 61 will be advanced leftward as seen in FIG. 5 so as to draw out the tool holders 10 from the tapered bores 80 and 30 which are respectively provided on the spindle 9 and the arm 28 of the intermediate tool transfer device 16. The change arm 61 will, thereafter, be rotated by the rotary actuator 59 by an angle of 180 degrees in a clockwise direction in order to exchange the tool holders 10. Pressurized fluid will then be supplied to the left chamber of the cylinder 51 through a conduit 100, for retracting the piston 50 and the change arm 61 so as to insert the tool holders 10 into the tapered bores 80 and 30.

It should be understood that the relays CR51 and CR52, CR54, CR55 and CR63 will be de-energized since the relay CR50 at line L7 will be de-energized by an opening of the contact CRLS98-1 of the limit switch 98 in accordance with the forward movement of the change arm 61.

Since high pressurized fluid will have been supplied to the outer chambers of the cylinders 62 of the tool transfer device 17, as described above, pressure switches PS75 and PS76 will be in an actuated position. Also, since pressurized fluid will have been supplied to the right chamber of the cylinder 84 so as to cause the drawing device 82 to release the tool holder 10, pressure switch PS101 will be in an actuated position. A relay CR70, not shown, will be energized when the change arm 61 of the tool transfer device 17 is retracted after the forward movement thereof. Accordingly, a relay CR60 at line L27 will be energized through contacts CRLS98-3, CRPS75-1, CR70-1, CRPS-76-1 and CRPS101-1 and will be self-held through a contact CR60-2. The solenoid operated valve 71 will be shifted in accordance therewith to a state opposite to that shown in FIG. 6 in which low pressurized fluid will be supplied to the outer chambers of the cylinders 62 through the reducing valve 74, so that the gripping force of the fingers will be decreased. The pressure switch PS75 for high pressure will therefore be shifted to a non-actuated position, while the pressure switch PS76 for low pressure will be maintained in the actuated position. A relay CR61 at line L28 will be energized in accordance therewith through a normally closed contact CRPS75-2 and contacts CRPS76-2, CR60-3 and will be self-held through a contact CR61-8. The relay CR50 at line L7 will be energized by a closing of a contact CR60-1 at line L8 and will be self-held through the contact CR50-1. Since a contact CR61-3 at line L14 will be closed in accordance with the energization of the relay CR61, the relay CR52 at line L13 will be energized. A contact CR61-5 and a normally closed contact CR57-3 at line L17 will be in a closed position, and the timer TR2 accordingly will be energized. The relay CR53 will be energized the predetermined period of time after the timer TR2 is energized. Since a contact CR61-2 and a normally closed contact CR57-1 at line L3 will be in a closed position, the relay CRM1A will be energized by a closing of the contact CR53-1 and will be self-held through the contact CRM1A-1. Accordingly, the spindle 9 will be rotated at the lowest rotational frquency by the motor M. As described above, the relay 55 will be energized in accordance with the first revolution of the spindle 9. When the second dog 93 gets clear of the contactless microswitch 95 in the second revolution of the spindle 9, a relay CR56 at line L22 will be energized through a normally closed contact CRLS95-4 and contacts CR61-6 and CR55-5 and will be self-held through a contact CR56-1. The contactless microswitch 95 will be actuated by the second dog 93 in accordance with the further rotation of the spindle 9. Since a contact CRLS95-5 at line L23 will be closed in accordance therewith and a contact CR56-2 will be in a closed position, a relay CR57 at line L23 will be energized and self-held through a contact CR57-2. The normally closed contact CR57-1 at line L3 will therefore be opened, and the relay CRM1A will be de-energized and the motor M stopped. It should be understood that the key 81 of the spindle 9 will abut on the key 48 of the tool holder 10 in accordance with two revolutions of the spindle 9.

Since a contact CR57-3 and CRTR1-5 at line L29 will be closed when the spindle 9 is stopped, a relay CR62 at line L29 will be energized. The solenoid operated valve 89 will be shifted to a state opposite of that shown in FIG. 7 in accordance with the energization of the relay CR62, whereby the drawing device 82 will clamp the tool holder 10 on the spindle 9. Pressurized fluid will then be supplied to the inner chambers of the cylinders 62, so that the pistons 63 will be moved in an outward direction and the fingers 67 will be rotated by means of the rack and pinion 66, 69 in such a manner that they will release the tool holders 10. The change arm 61 will be rotated by the rotary actuator 59 by an angle of 90° in a counterclockwise direction, whereby the same will be at the horizontal position. Then, the next machining operation will be performed.

Obviously, numerous modifications and variations of the present invention are possible in light of the above teachings. It is therefore to be understood that within the scope of the appended claims, the invention may be practiced otherwise than as specifically described herein. Accordingly,

We claim:

1. A machine tool comprising:
a base;
a spindle head mounted on said base;
a spindle rotatably mounted in said spindle head, said spindle having a coaxial bore and a projection at one end thereof;
drawing means provided in said spindle for clamping a tool in the spindle;
power means for rotating said spindle;
a tool magazine for removably storing diverse tools, each of said diverse tools having a projection at the periphery thereof;
tool transfer means for transferring the tool between said spindle and said tool magazine;
first control means for controlling a stopping range of said projections on said spindle in order to avoid interference between said projection on said spindle and a succeeding tool when said succeeding tool is transferred to said spindle by said tool transfer means;
second control means for operating said power means to rotate said spindle through at least one revolution, while the tool for use in a succeeding machining operation is held by said tool transfer means in said bore of the spindle, so as to abut the projection of the spindle on the projection of said succeeding tool; and
third control means for causing said drawing means to clamp said succeeding tool in the spindle after completing the rotation of said spindle by said first control means.

2. A machine tool comprising:
a base;
a spindle head mounted on said base;
a spindle rotatably mounted in said spindle head, said spindle having a coaxial bore and a projection at one end thereof;

drawing means provided in said spindle for clamping a tool in the spindle;

first power means for rotating said spindle;

a tool magazine for removably storing diverse tools, each of said diverse tools having a projection at the periphery thereof;

tool transfer means for transferring the tool between said spindle and said tool magazine, said tool transfer means having at least one pair of fingers for gripping the tool therebetween;

second power means for operating said pair of fingers;

first control means for controlling said second power means to decrease the gripping force of the fingers when the tool for use in a succeeding machining operation is inserted into said bore of said spindle;

second control means for operating said first power means to rotate said spindle through at least one revolution in accordance with the decrease of the gripping force of the fingers so as to abut the projection of the spindle on the projection of the next succeeding tool; and third control means for causing said drawing means to clamp the next succeeding tool in the spindle after the completion of rotation of said spindle by said second control means.

3. A machine tool comprising:

a base;

a spindle head mounted on said base;

a spindle rotatably mounted in said spindle head, said spindle having a coaxial bore and a projection at one end thereof;

drawing means provided in said spindle for clamping a tool in said spindle;

first power means for rotating said spindle;

indicating means for indicating the position of the projection of the spindle;

a tool magazine for removably storing diverse tools, each of said diverse tools having a projection at the periphery thereof;

intermediate tool transfer means for transferring the tool between said tool magazine and an intermediate station;

inspecting means for inspecting the position of the projection of the tool at said intermediate station;

tool transfer means for transferring the tool between said intermediate station and said spindle;

first control means for causing said first power means to rotate the spindle in response to said inspecting means for inserting the tool into the bore of said spindle through said tool transfer means without interference between the projection of the spindle and the projection of the tool;

second control means for operating said first power means for rotating the spindle through at least one revolution, while the tool for use in a next succeeding machining operation is held by said tool transfer means in said bore of the spindle, so as to abut the projection of the spindle on the projection of the next succeeding tool; nd third control means for causing said drawing means to clamp the next succeeding tool in the spindle after completion of the rotation of said spindle by said second control means.

4. A machine tool as set forth in claim 3, wherein said indicating means comprises:

first detecting means mounted on said spindle head for indicating that the projection of the spindle is in a first stop range;

a first dog mounted on said spindle for actuating said first detecting means;

second detecting means mounted on said spindle head for indicating that the projection of the spindle is in a second stop range; and a second dog mounted on said spindle for actuating said second detecting means.

5. A machine tool as set forth in claim 3, wherein said inspecting means comprises:

a bracket disposed at said intermediate station;

a lever pivotally mounted on said bracket;

an arc-shaped member secured to one end of said lever such that the same is aligned with the periphery of the tool at said intermediate station; and detecting means for indicating the engagement of the projection of the tool with said arc-shaped member being mounted on said bracket in opposed relation with the other end of said lever.

6. A machine tool as set forth in claim 3, wherein said intermediate tool transfer means comprises:

a support mounted on said spindle head;

a shaft rotatably mounted on said support;

second power means mounted on said support for rotating the shaft;

a piston secured to the end of said shaft;

a cylinder slidably and non-rotatably receiving said piston;

an arm fixedly mounted on said cylinder; and holding means provided on the end portion of said arm for holding the tool.

7. A machine tool as set forth in claim 3, wherein said tool transfer means comprises:

a shaft mounted on said spindle head;

second power means for moving said shaft in an axial direction;

third power means for rotating said shaft;

a change arm secured to said shaft at the middle portion thereof;

opposing cylinders provided on both ends of said change arm;

respective pistons slidably received in said opposing cylinders, each of said pistons being provided with racks at the opposite sides thereof;

a pair of fingers pivotally mounted on each end of said change arm, said fingers being provided with respective gears engaged with said opposite racks.

8. A machine tool as set forth in claim 7, further comprising:

a reducing valve connected to the outer chambers of said cylinders through a changeover valve, said reducing valve and said changeover valve being respectively connected to a pressure source.

9. A machine tool comprising:

a base;

a spindle head mounted on said base;

a spindle rotatably mounted in said spindle head and provided with an engaging means;

a power means for rotating said spindle;

a tool magazine for removably storing diverse tools, each of said diverse tools having an engaging means;

drawing means provided in said spindle for clamping a tool therewithin;

tool transfer means for transferring a tool between said spindle and said tool magazine;

inspecting means for inspecting an angular position of said engaging means on said tool;

detecting means for controlling a stopping range of said engaging means on said spindle in response to said inspecting means in order to avoid interference between said engaging means on said spindle and said engaging means on said tool being transferred; and control means for abutting both said engaging means on said spindle and said engaging means on said tool with each other by relative rotation between said spindle and said tool while said tool is supported within said spindle by said tool transfer means after a tool change operation is performed thereby.

* * * * *